(12) United States Patent
Armstrong et al.

(10) Patent No.: US 9,823,704 B2
(45) Date of Patent: Nov. 21, 2017

(54) PROTECTIVE CASE FOR A COMPUTING DEVICE WITH ADJUSTABLE STAND

(71) Applicant: URBAN ARMOR GEAR, LLC, Laguna Niguel, CA (US)

(72) Inventors: Steven Armstrong, Laguna Niguel, CA (US); Jay Veltz, Laguna Niguel, CA (US)

(73) Assignee: Urban Armor Gear, LLC, Laguna Niguel, CA (US)

( * ) Notice: Subject to any disclaimer, the term of this patent is extended or adjusted under 35 U.S.C. 154(b) by 0 days.

(21) Appl. No.: 15/226,273

(22) Filed: Aug. 2, 2016

(65) Prior Publication Data

US 2017/0045920 A1    Feb. 16, 2017

Related U.S. Application Data

(60) Provisional application No. 62/205,532, filed on Aug. 14, 2015.

(51) Int. Cl.
  *H05K 5/00*     (2006.01)
  *G06F 1/16*     (2006.01)

(52) U.S. Cl.
  CPC .......... *G06F 1/1669* (2013.01); *G06F 1/1626* (2013.01); *G06F 2200/1633* (2013.01)

(58) Field of Classification Search
  CPC ................. G06F 1/1669; G06F 1/1626; G06F 2200/1633
  See application file for complete search history.

(56) References Cited

U.S. PATENT DOCUMENTS

| | | | | |
|---|---|---|---|---|
| 7,299,580 B2* | 11/2007 | Wang | ..................... | F16M 11/10 248/461 |
| 7,916,478 B2* | 3/2011 | Tu | .......................... | F16M 11/10 248/398 |
| 8,201,687 B2* | 6/2012 | Zeliff | .................... | G06F 1/1626 206/320 |
| 8,807,333 B1* | 8/2014 | Cooper | .................. | A45C 11/00 206/320 |
| 8,922,995 B2* | 12/2014 | Su | .......................... | F16M 11/10 248/917 |
| 9,671,830 B2* | 6/2017 | Chen | ...................... | G06F 1/166 |
| 2009/0321609 A1* | 12/2009 | Wang | .................... | G06F 1/1626 248/685 |
| 2011/0285258 A1* | 11/2011 | Yuan | ..................... | G06F 1/1626 312/223.2 |

(Continued)

*Primary Examiner* — Robert J Hoffberg
*Assistant Examiner* — Hung Dang
(74) *Attorney, Agent, or Firm* — Troutman Sanders LLP

(57) ABSTRACT

A case for a computing device includes a rear support surface that is operatively coupled to a perimetral edge that securely engages with a perimetral edge of the computing device. A support stand may be in communication with the rear support surface, wherein the stand is operable to move between one or more elevations. The rear support surface and the perimetral edge may substantially or entirely shield a rear surface of the computing device. The support stand may include a stand mechanism with support and pivot portions, the support portion operable to communicate with a corresponding mounting surface and the pivot portion operable to pivot the support stand between a closed state and one or more elevations.

5 Claims, 16 Drawing Sheets

(56) References Cited

U.S. PATENT DOCUMENTS

| | | | |
|---|---|---|---|
| 2012/0218699 A1* | 8/2012 | Leung | G06F 1/1616 361/679.08 |
| 2013/0020214 A1* | 1/2013 | Chiou | G06F 1/1626 206/320 |
| 2014/0167431 A1* | 6/2014 | Enkerlin | F16M 11/10 294/142 |

* cited by examiner

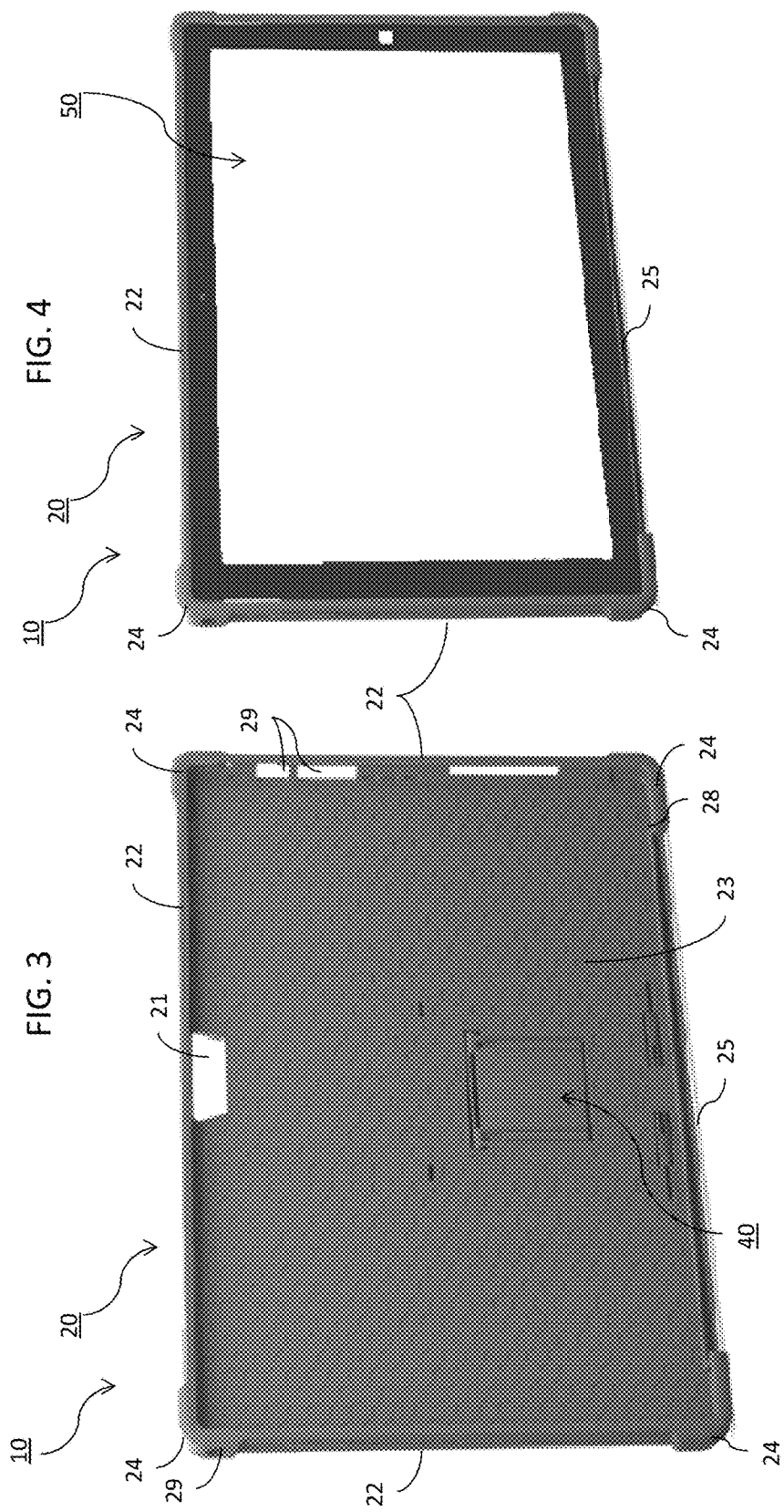

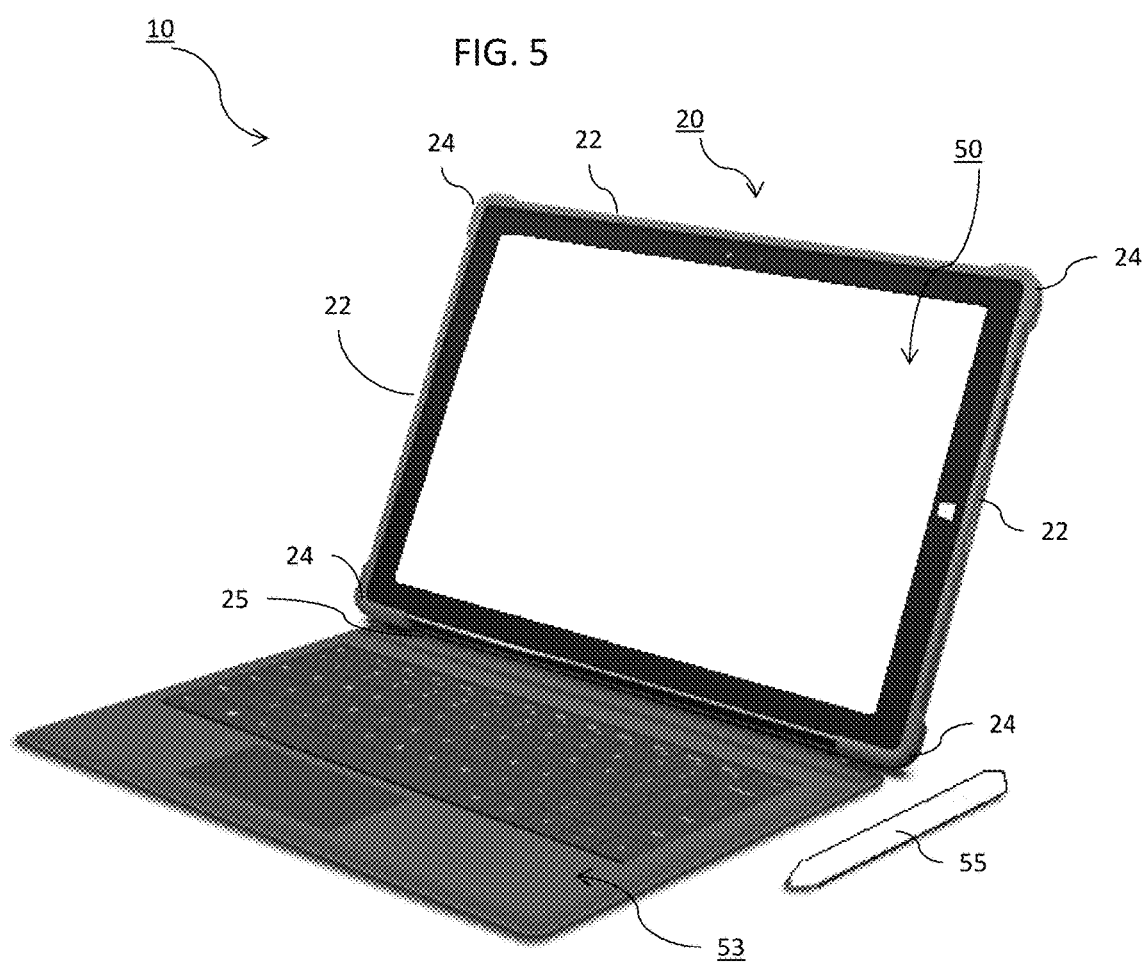

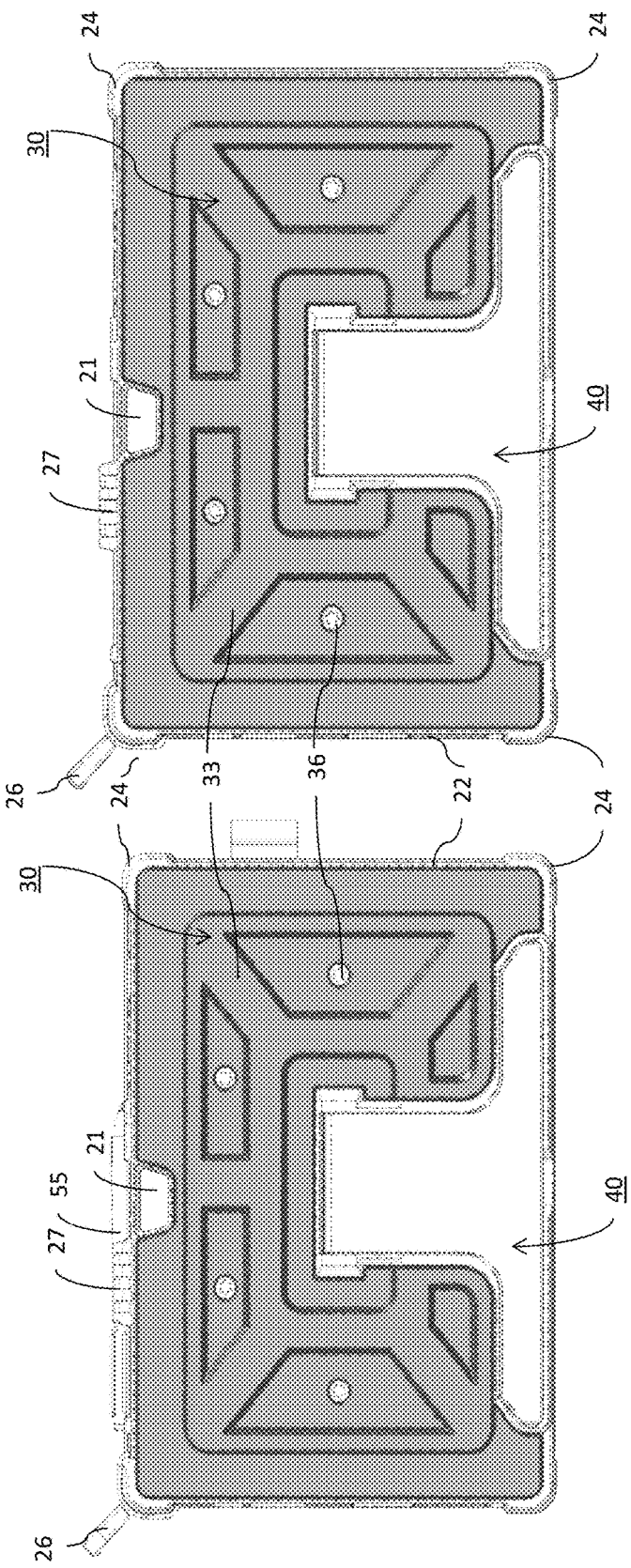

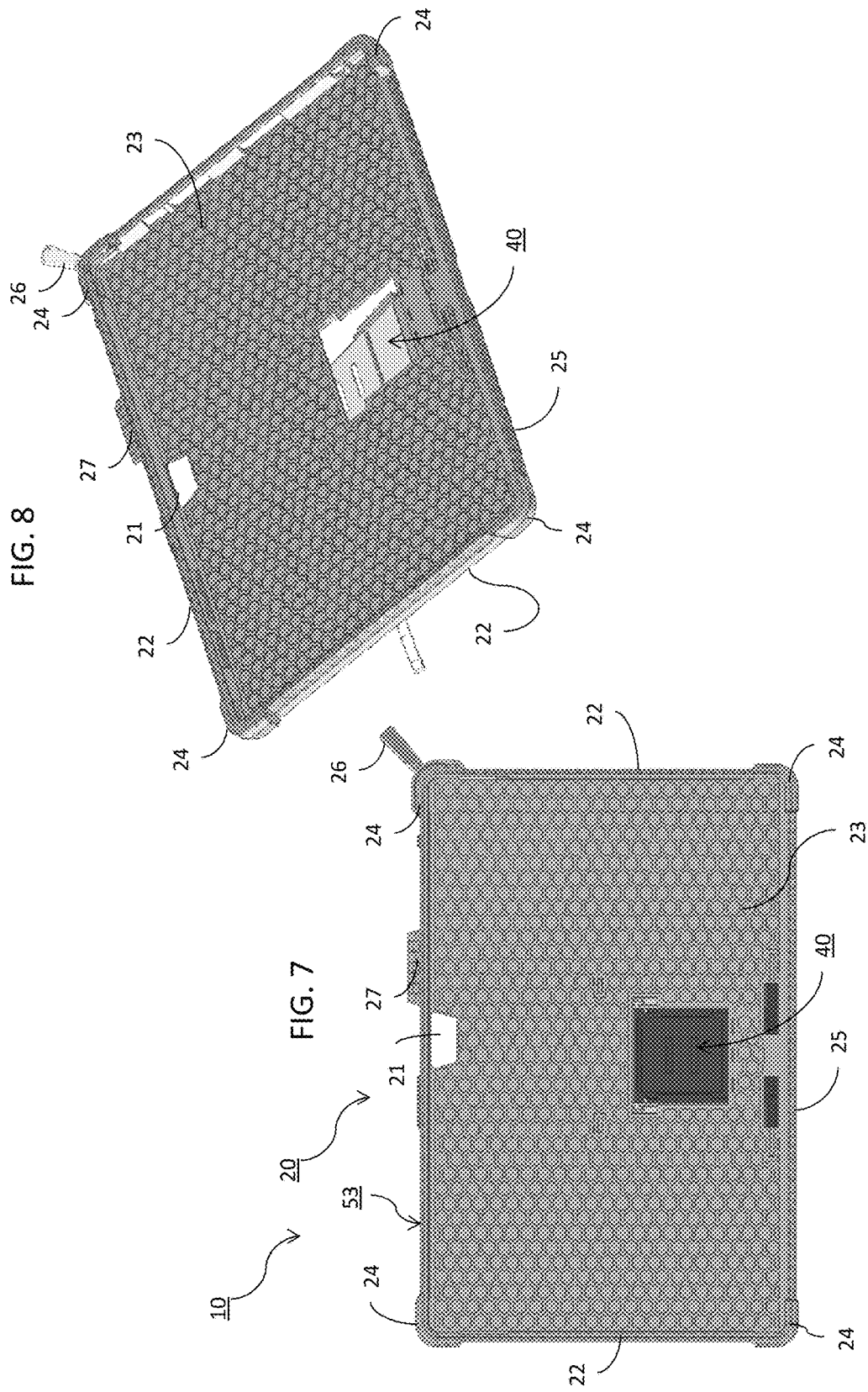

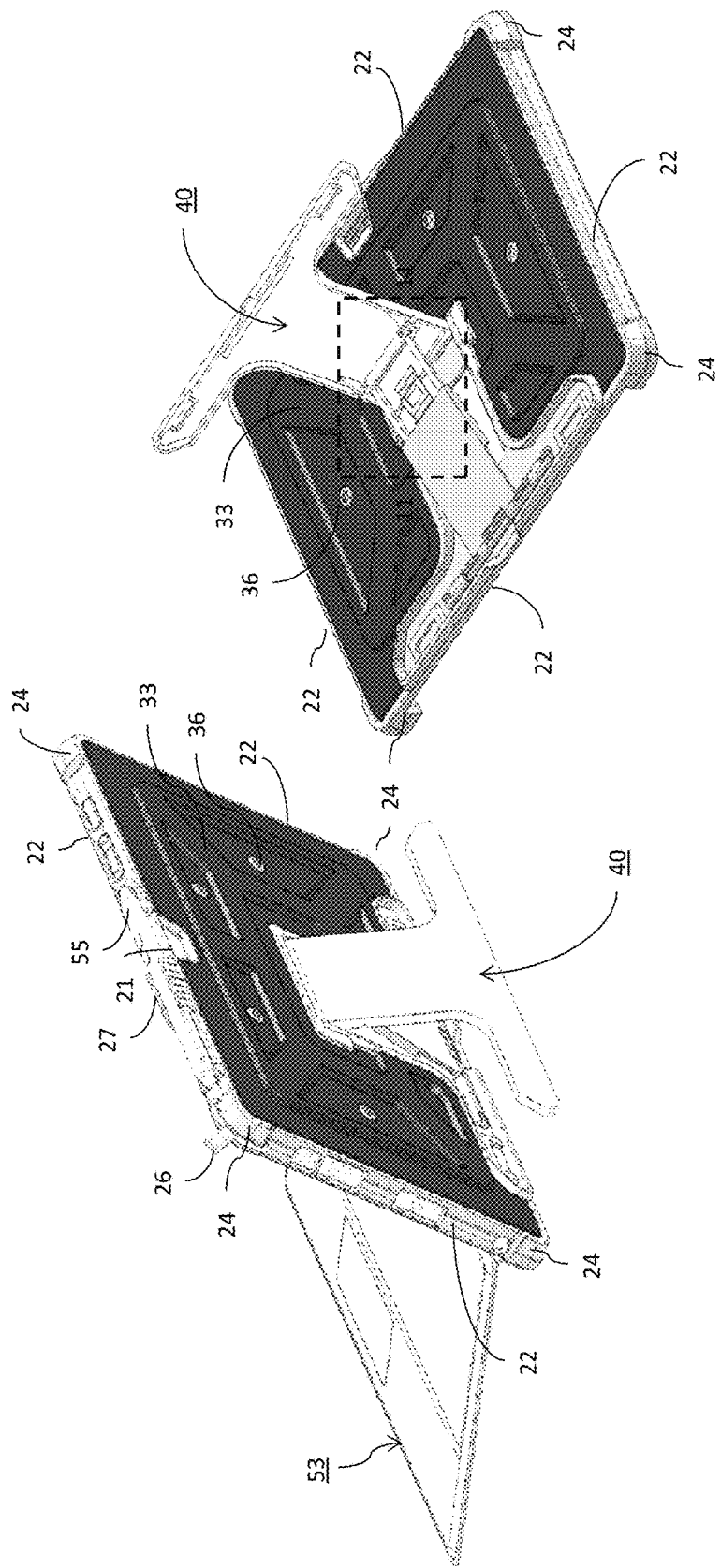

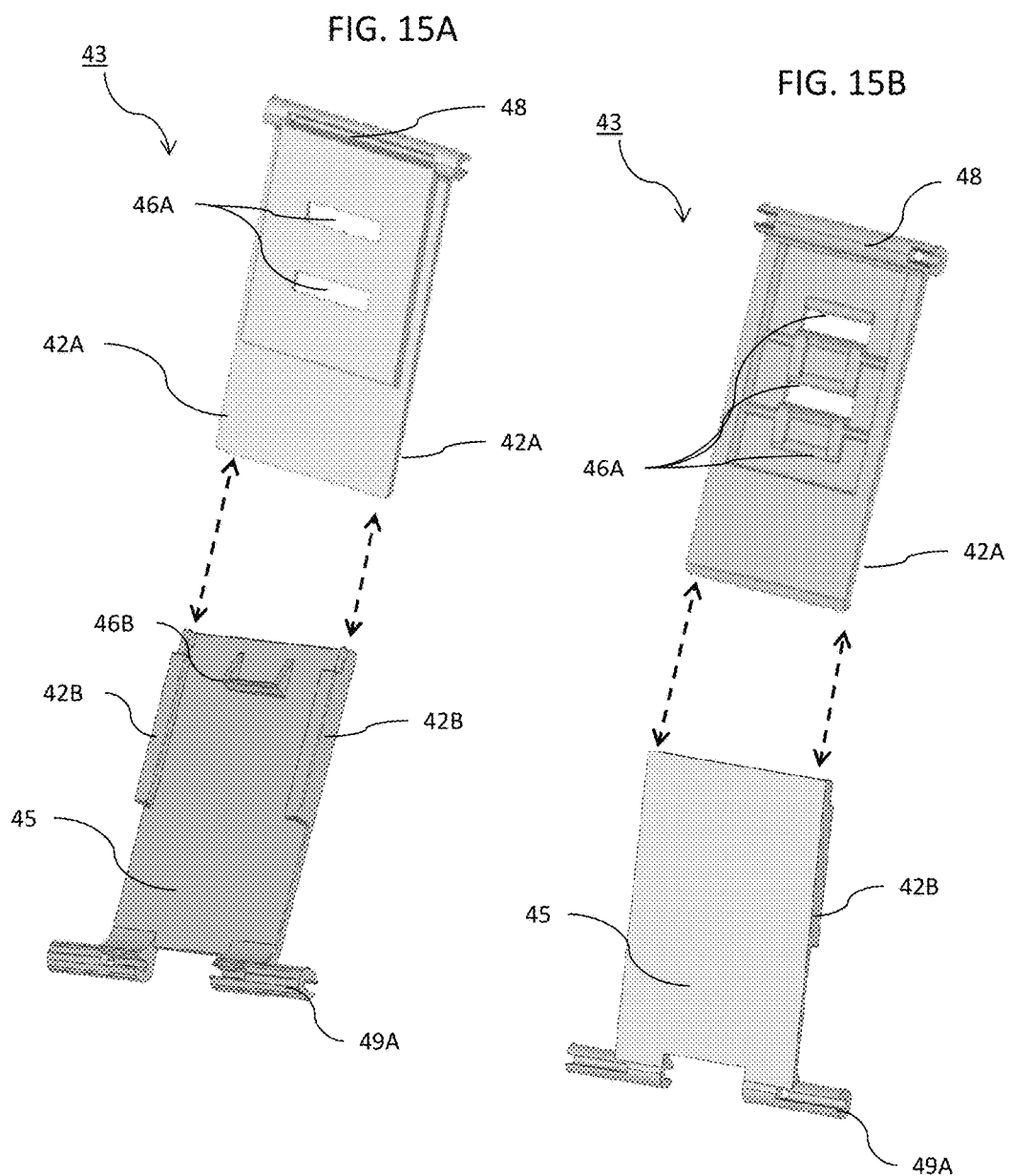

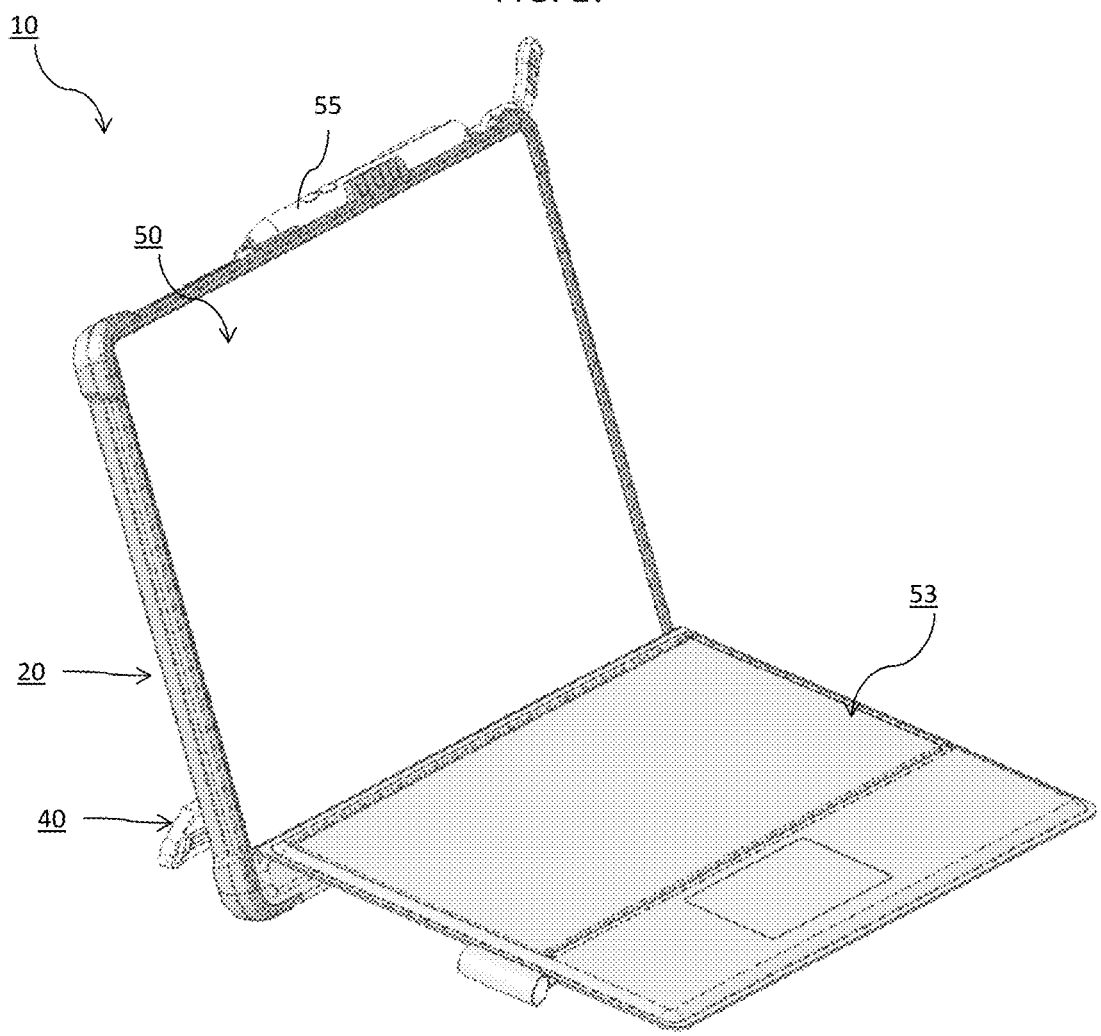

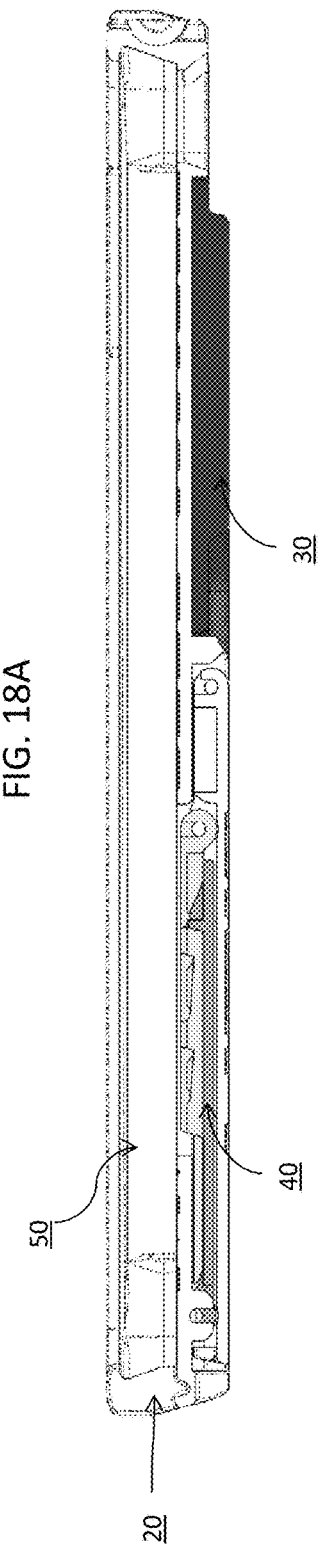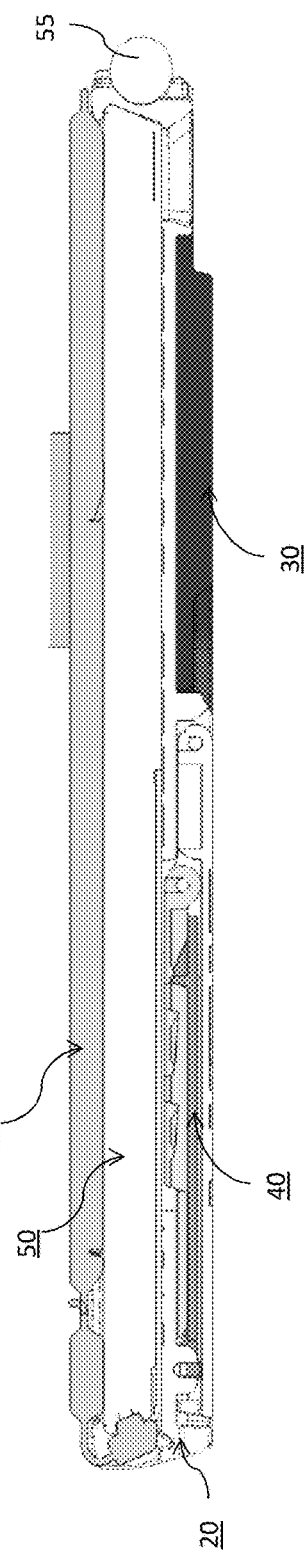

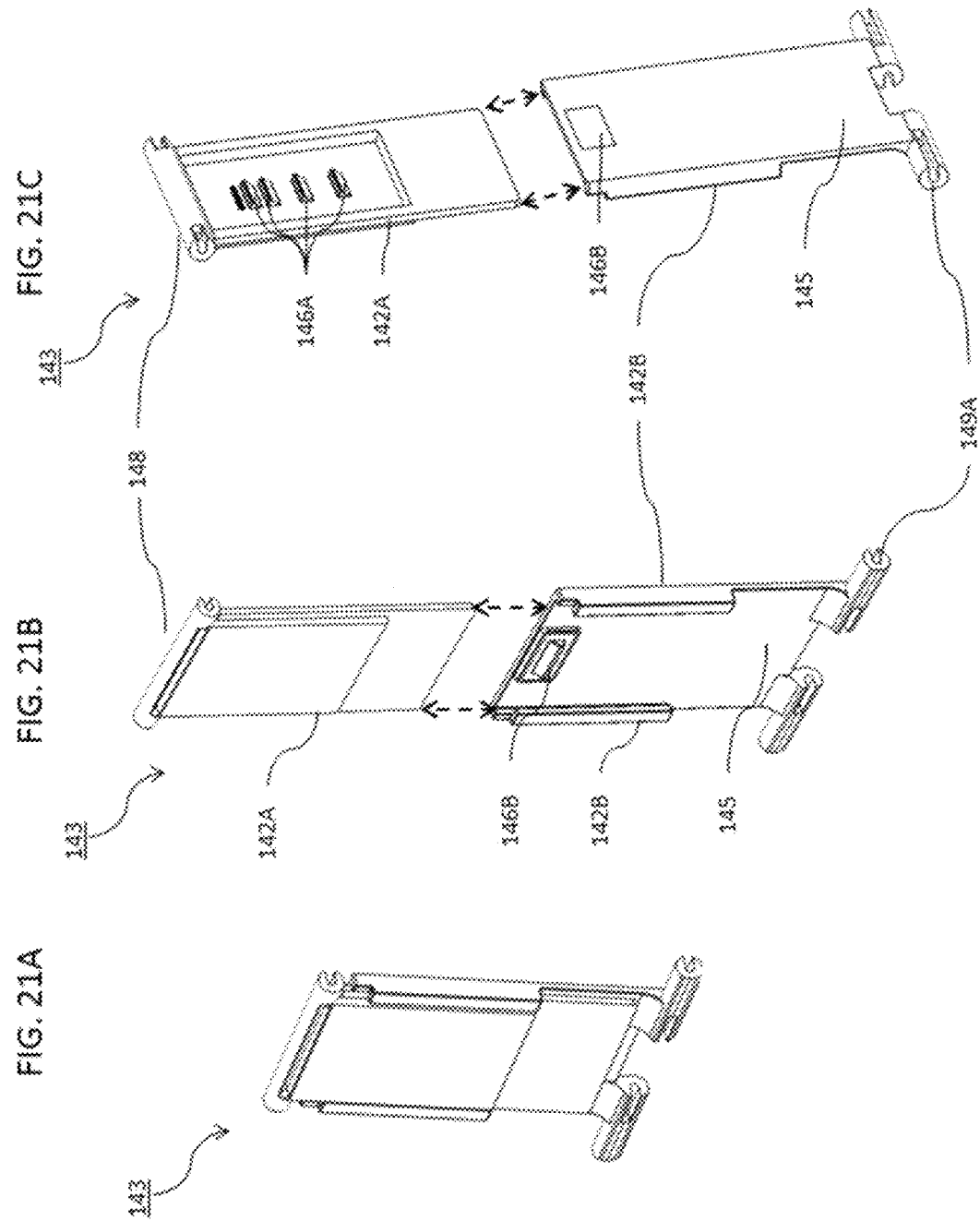

PROTECTIVE CASE FOR A COMPUTING DEVICE WITH ADJUSTABLE STAND

CROSS-REFERENCE TO RELATED APPLICATION

This Application claims priority to and benefit under 35 U.S.C §119(e) of U.S. Provisional Patent Application Ser. No. 62/205,532, filed Aug. 14, 2015, the contents of which are hereby incorporated by reference in their entirety as if fully set forth below.

FIELD

This disclosure relates generally to protective cases for computing devices and more particularly, protective cases for mobile computing devices such as smart phones, tablets, PDAs, and laptops.

BACKGROUND

With increasing regularity, protective cases are being constructed for a variety of computing devices such as smart phones, tablets, PDAs and/or other portable computing devices. Their respective designs vary, ranging between degrees of protection as well as facilitating use of the computing device in a more protected environment.

Cases have been known to be constructed from molding using silicon or thermoplastic polyurethane rubber that provides some basic protection against drops and scratches. Other case designs have been constructed from relatively stiffer injected plastics such as polycarbonate.

The design and construction of the known cases therefore vary depending on the desired amount of protection, costs, and consideration for certain materials and mounting schemes balanced with features that facilitate performance of the computing device itself. For example, certain material may provide basic structural protection, be relatively cheap, but this material may induce too much friction (e.g. grip) to the user that interferes with easy attachment of the case with the device or grip with other articles such as parts of the user's body or other objects foreign to the case.

In addition to material selection, cases can suffer from being too bulky and difficult to stow away. It is also known that materials for certain cases can degrade over time thereby diminishing protective capabilities of the case as well as loosening its attachment with the computing device. Aesthetically, a worn case also diminishes the overall impression of the case and the attached computing device. Such cases can also have reduced bulk versus their rubber counterparts. Plastic injected mold cases can suffer from passing on relatively high material stresses to the computing device itself due to the differing elasticity and cushioning. For computing devices with sensitive displays or input devices, such protective devices may therefore may not be desirous.

Certain cases also decrease the ability of a device positioned within them to expel heat by virtue of the materials chosen or the coverage over vents or other heated areas of the device.

Certain hybrid combinations have therefore been designed to combine each approach with the softer, cushion portions being placed in communication with the computing device whereas the exterior portion being constructed from the less bulky, injected plastic.

Yet, even with these hybrid solutions, stress tests to the computing devices caused by normal use through drops or collisions can lead to device damage and case separation. In turn, the user may have to fix the device, buy a new one, and/or re-assemble the case with the computing device. Furthermore, many cases fail to completely protect or envelope the associated computing device which unnecessarily risks structural harm to the computing device.

Known cases also suffer by limiting accessibility or storage for certain features of the computing device received by the case. Many cases, such as folio type cases used with computing devices, are designed to allow a portion of the case to fold and be used in a stand to adjust the angle and elevation of the device in certain positions. However, such cases have been known to be cumbersome and difficult to use as far as adjusting the elevation or position of the case itself. Therefore, a need exists to resolve these and other problems in the art.

SUMMARY

The following simplified summary is provided in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In a preferred embodiment, a case for a computing device includes a rear support surface that is operatively coupled to a perimetral edge that securely engages with a perimetral edge of the computing device. A support stand may be in communication with the rear support surface, wherein the stand is operable to move between one or more elevations. The rear support surface may have a greater material strength (e.g. stiffness, rigidity, etc.) than the perimetral edge of the case. It is contemplated that the rear support surface and the perimetral edge may be integrally formed with, or detachably connected to, each other.

The stand may be substantially recessed in or substantially parallel with the rear support surface. The rear support surface and the perimetral edge may partially, substantially, or preferably entirely shield a rear surface of the computing device.

An external shield portion may be integrally formed with or detachably connected to the rear support surface. In this respect, the external shield portion may be dimensioned to correspond with the rear support surface and at least partially cover a rear portion of the computing device. Optionally, the external shield portion may include one or a plurality of impact resistant portions or resilient portions. The impact resistant or resilient portions may be constructed from foam, a polymer, or an elastomer.

In other embodiments, the rear support surface may be selectively constructed throughout or in one or more predetermined locations with a reinforced honeycomb design. Optionally, the case may be constructed from a single material or wherein the perimetral edge may be relatively flexible or resilient and the rear support surface may be impact resistant. In certain embodiments, one or more cutout or window portions may be included to provide access to actuators of the computing device and/or visibility to one or more optical systems of the computing device. The cutout or window portions may be removable, integrally formed therewith, or trimmable as needed or required. Optionally, one or more actuator surfaces may be included with the perimetral edge and/or the rear support surface to correspond with actuators of the computing device.

In other embodiments, an externally positioned receiver for a control mechanism of the computing device may be included with the case. The receiver may be detachable through one or more corresponding fastening mechanisms or may be integrally formed with the case. The case may also include one or more impact resistant corners formed with the perimetral edge and/or rear support surface.

Preferably, the perimetral edge of the case may be defined by extending away from the rear support surface and terminating in an inwardly extending lip. The inwardly extending lip may be wider than the portion of the perimetral edge extending away from the rear support surface. The perimetral edge may be operable to flex outwards while also being capable of securely retaining the computing device once said computing device is assembled with the inwardly extending lip.

In certain embodiments, the support stand may pivot about a first rotational axis of the rear support surface and may include a stand mechanism with support and pivot portions. The support portion may be operable to communicate with a corresponding mounting surface and the pivot portion may be operable to pivot the support stand between a closed state and one or more elevations. Optionally, the support portion may be wider than the pivot portion but the case is not so limited and the support portion and pivot portion may include any reasonable shape or width ratio according to need or preference. The support portion can include one or more fastening mechanisms operable to securely engage with the rear support surface in the closed state such as one or more bolts, clamps, couplings, hooks, pins, latches or magnets.

The pivot portion may also include first and second pivot couplings, the first pivot coupling pivotally engaged with the first rotational axis of the rear support surface and the second pivot coupling pivotally engaged with a pivot arm. Preferably, the pivot arm may be pivotally engaged with a second rotational axis of the rear support surface. In this respect, the second rotational axis may be aligned with or otherwise in communication with the support portion in the closed state. The pivot arm may further comprise a guide in communication with the second pivot coupling, the guide optionally including a plurality of predetermined positions. The pivot arm in turn may be slidable about or along the guide between the predetermined positions, wherein each predetermined position corresponds to an elevation of the case. Preferably, the second rotational axis may be adjacent to, aligned with, or in contact with a lower part of the perimetral edge of the case.

In other embodiments, the perimetral edge or the rear support surface may be operatively coupled to a detachable base along its lower portion. The detachable base may attach to a retaining groove or pivot axis of the rear support surface. The detachable base may also be constructed from at least impact resistant material and operable to securely engage with the perimetral edge when the case is in a closed state. The detachable base may also be operable to completely or substantially envelope and/or shield the computing device in the closed state. The detachable base may also be operatively coupled to the rear support surface with one or more fasteners such as snap fit connectors, cables, clamps, couplings, dowels, hooks, keys latches, or magnets.

A variety of methods and systems of utilizing and assembling the disclosed case is also contemplated in a variety of situations and environments. To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

FIG. 3 is forward perspective view of an exemplary case showing its interior portion.

FIG. 4 is a forward perspective view of an exemplary case, wherein the case has now received the computing device.

FIG. 5 is a forward perspective of an exemplary case operatively attached to a base device.

FIG. 6A is a rear plan view of an exemplary case, wherein the case is in a closed state with a control mechanism of the computing device assembled thereto.

FIG. 6B is a similar view of FIG. 6A, wherein the control mechanism is no longer assembled thereto.

FIG. 7 is a rear plan view of the receiving portion with the computing device removed.

FIG. 8 is a perspective view of the embodiment of FIG. 7.

FIG. 9 is a rear perspective view of an exemplary case assembled with a computing device and a base device.

FIG. 10 is a similar rear perspective of FIG. 9, wherein the case has been rotated to observe interaction between the adjustable stand and the case.

FIG. 15A is a forward perspective view of exemplary features of the adjustable support stand.

FIG. 15B is a rear perspective view of the features of FIG. 15A.

FIG. 17 is a forward perspective view of an exemplary case assembled with computing and base devices in a deployed state.

FIG. 18A is a side plan view of the embodiments of FIG. 17 when in a closed, portable state.

FIG. 18B is a similar view of FIG. 18A but further depicting a detachable base device when assembled with the case of FIG. 18A in the closed, portable state.

FIG. 21A is a forward perspective view of exemplary features of the adjustable support stand in an assembled state.

FIG. 21B is a forward perspective view of exemplary features of the embodiment in FIG. 21A in an exploded state.

FIG. 21C is a rear perspective view of exemplary features of the embodiment in FIG. 21A in an exploded state.

DETAILED DESCRIPTION

Figure 2:
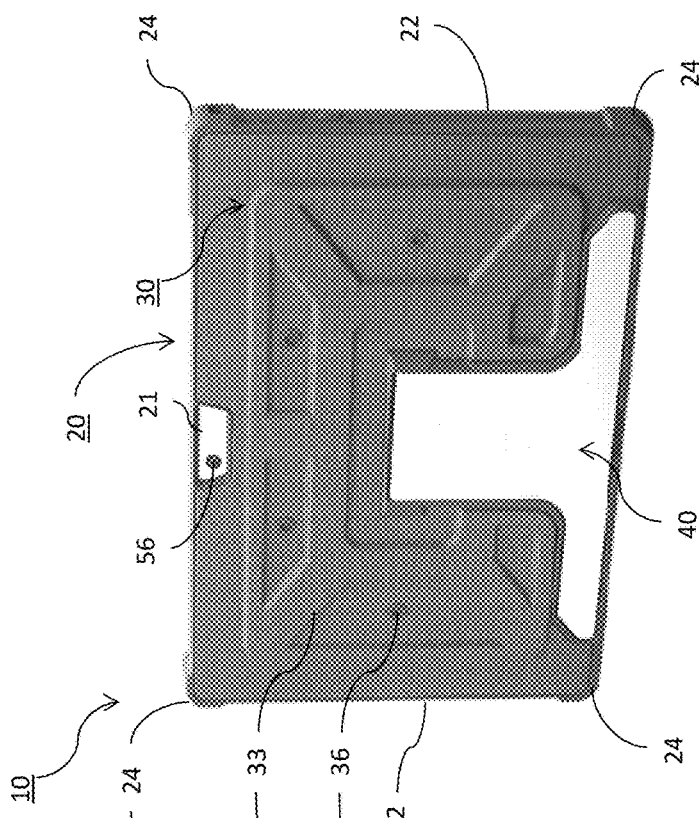
FIG. 2 is a rear perspective view of an exemplary case, wherein the stand is in a retracted state.

The features of the presently disclosed solution may be economically molded or assembled by using one or more distinct parts and associated components which, may be assembled together for removable or integral application with a known or to-be-designed computing device case in an economical manner, wherein the features of the present disclosure may form the herein disclosed servicing apparatus regardless of the particular form. Unless defined otherwise, all terms of art, notations and other scientific terms or terminology used herein have the same meaning as is commonly understood by one of ordinary skill in the art to which this disclosure belongs.

Terms with commonly understood meanings may be defined herein for clarity and/or for ready reference, and the inclusion of such definitions herein should not necessarily be construed to represent a substantial difference over what is generally understood in the art. All patents, applications, published applications and other publications referred to herein are incorporated by reference in their entirety. If a definition set forth in this section is contrary to or otherwise inconsistent with a definition set forth in the patents, application, published applications and other publications that are herein incorporated by reference, the definition set forth in this section prevails over the definition that is incorporated herein by reference.

As used herein, "a" or "an" means "at least one" or "one or more." As used herein, the term "user", "subject", "end-user" or the like is not limited to a specific entity or person. For example, the term "user" may refer to a person who uses the systems and methods described herein, and frequently may be a technician. However, this term is not limited to end users or technicians and thus encompasses a variety of persons who can use the disclosed systems and methods.

The disclosed solution can now be better understood turning to the following detailed description. It is to be expressly understood that the illustrated embodiments are set forth as examples and not by way of limitations on the embodiments as ultimately defined in the claims. An embodiment in accordance with the present disclosure provides a cover for a computing device such as a smart phone with an adjustable stand, tablet or any other portable computing device. The cover can be made of multiple parts, integrally formed therewith or detachable.

It is understood that "computing device" can mean any mobile device such as a cellular phone, a mobile phone, a smart phone, a tablet computing device, PDAs or the like.

"Shield" as used herein with the disclosed case can mean to protect, wrap around, or envelope a corresponding computing device in a manner that conceals the computing device from injuries during a drop or accident such as by impact or collision.

"Impact resistant" or "impact resistance" as it relates to the herein disclosed case features can mean any feature designed to withstand relatively high applied forces or related shock across the design life of the disclosed case. Accordingly, features or materials described herein as providing impact resistance or being impact resistant utilize material properties and/or structural design of the case directed towards mitigating the effects of expected events in the life-cycle of the case and corresponding computing device that incur impact (e.g. drops, collisions, accidents, etc).

"Honeycomb design" as described herein is contemplated to signify any natural or man-made structure such as a plastic injected mould or composite sandwich structure that includes geometry of a honeycomb. It is understood that such honeycomb designs include structures that have the geometry to reach minimal weight and maximum strength and may provide a material with least density and relative high compression properties and shear properties. This structure may reinforce structural integrity in the feature it is included and/or may also allow the minimization of the amount of used material to optimize feature weight and material costs.

The herein disclosed solution described a case capable of exhibiting the shock resistant benefits of a case with elastomeric edges or outer portions combined with the consumer usability benefits of a resilient outer case such as relatively stronger plastics. The herein described solution may also be a composite case with some combination of one or more elastic materials with one or more harder, resilient materials, such as injection molded plastic and/or rubber, in a way that forms a permanent bond therebetween resulting in a protective system that sufficiently securely retains and protects a computing device in most operating conditions including, but not limited to, the standards set forth by MIL-STD 810G, 506.6 VI. The herein disclosed solution also contemplates a composite case in which the geometric shape of the constituent components maximizes overall structural strength and impact resistance while minimizing material weight and size.

Figure 1:
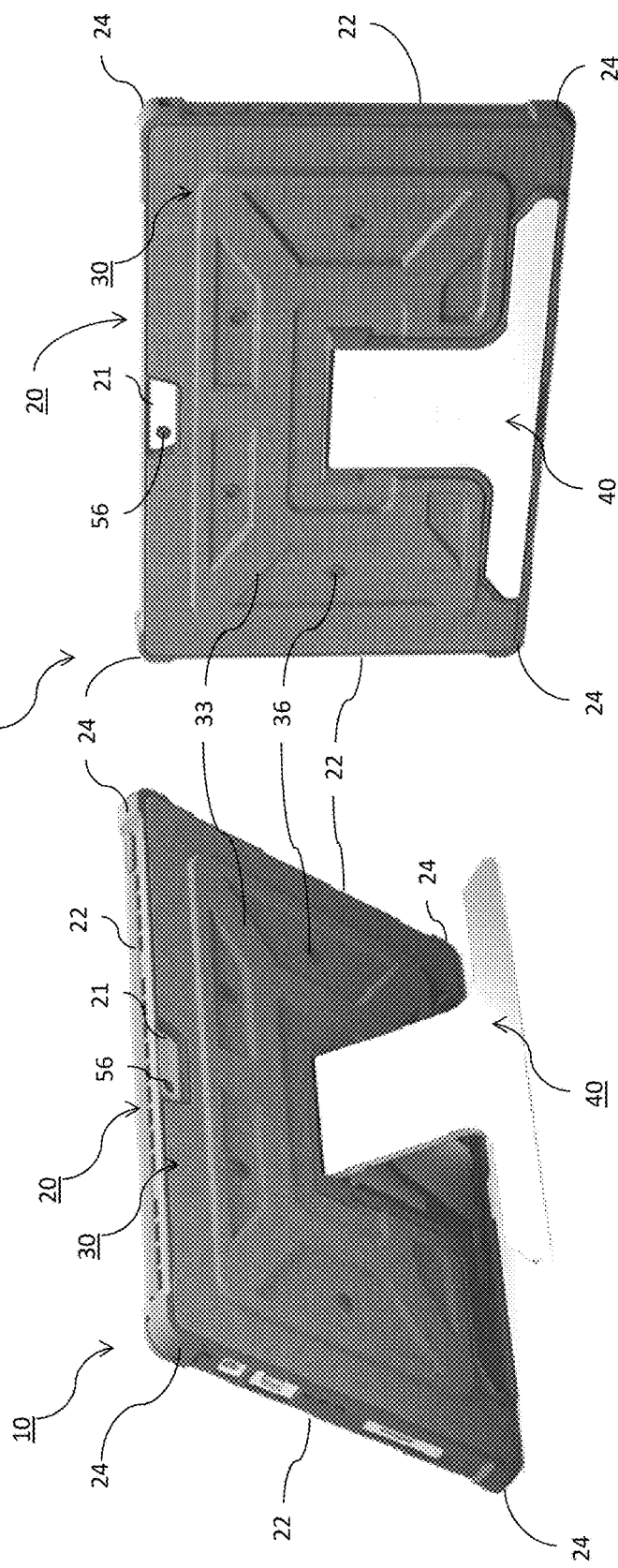
FIG. 1 is a rear perspective view of an exemplary view of the herein described protective case for a computing device with an adjustable support stand, wherein the stand is in a deployed state.

For simplicity and illustration purposes only, the presently disclosed case 10 is depicted for use with a tablet though the solution is not so limited and could be used with other referenced computing devices as understood in the context of this disclosure and other numerous consumer electronic devices, wherein case 10 would employ similar details, features and benefits. Turning to the figures, FIG. 1 depicts a case 10 with its adjustable support stand 40 in a deployed state. FIG. 2 depicts a similar embodiment but instead stand 40 is now in a closed state as discussed more particularly below. Case 10 may be operable to securely retain and shield a computing device 50 and preferably may be constructed from a forward receiving portion 20 and a rear exterior, external shield portion 30.

Portion 20 may be constructed from a relatively resilient material with a perimetral edge portion 22. Edge portion 22 may be substantially or partially flexible in one or more predetermined areas. For example certain areas of portion 22 immediately adjacent or nearby corners 24 may be relatively resilient or stiff whereas areas disposed in a central portion closer away from corners 24 may be more flexible so that portion 22 can conform to computing device 50 as needed. Corners 24 in turn may therefore be reinforced with one or more impact resistant materials and/or structural designs so as to withstand and shield device 50 during collision, drop or otherwise accidental conduct.

Turning to FIG. 3, case 10 is depicted without corresponding device 50 so that rear support surface 23 can be readily observed. Surface 23 may be defined by a structural backing plate and be structurally reinforced by, for example, utilizing a honeycomb pattern. The shapes associated with the honeycomb design may be raised or instead, the borders between the shapes may be raised. As a result, the honeycomb pattern of surface 23 can either be in a positive or negative relief configuration. Advantageously, the honeycomb embodiments of surface 23 may provide additional rigidity, strength or stiffness to portion 20 of case 10 in a manner that optimizes overall case 10 weight and material costs.

Preferably, edge 22 may be defined by extending away from the rear support surface 23 and terminating in an inwardly extending lip 28. Lip 28 may be wider or thicker than the lower portion of edge 22 extending away from the rear support surface 32. In this respect, perimetral edge 28 may be operable to flex outwards while also being capable of securely retaining device 50 once assembled with lip 28.

Portion 20 may also include optional optical system cutout 21 and/or actuator surfaces or cutouts 29 positioned with edge 22. Cutout 21 and/or surfaces 29 may be formed by being trimmed or cut from edge 22 by the end-user according to particular device 50. Edge 22 in turn may be formed with pre-etched portions operable to be trimmed or modified as needed by the end-user. Cutout 21 and/or surfaces 29 may also include corresponding hingeable covering surfaces or detachable covers that can be easily moved as needed or required to further shield corresponding optical system 56 of device 50 and/or related actuators positioned along the corresponding perimeter of device 50.

Edge 22 may also include a base receiving portion 25 that is thinner than the other portions of edge 22. In this respect, when a detachable base 53 (also referred to herein as a base device) is introduced with portion 20, portion 25 this reduced material creates a gap, space, or retaining groove operable to securely retain base 53 as described more particularly below.

FIG. 4 depicts case 10 in a manner similar to FIG. 3, whereas case 10 has now securely received device 50 in portion 20. Similarly, FIG. 5 depicts a forward perspective view of device 50 assembled with case 20, wherein base 53 is now operatively coupled therewith via portion 25. Portion 25 in turn may include the foregoing retaining groove with corresponding fasteners such as one or more snap fit connectors, cables, clamps, couplings, dowels, hooks, keys, latches, or magnets. Preferably, the fastening scheme of portion 25 will align base 53 as required to facilitate easy yet effective fastening as well as quick release of base 23 when required.

Turning to FIG. 6A, case 10 is depicted assembled with device 50's control mechanism 55 optionally received by mechanism receiver 27. Mechanism 55 in this particular embodiment is a digital stylus in the shape of an elongate member such as a pencil or pen. In this respect, receiver 27 is shown with a cylindrical receive that is operable to slidably receive and retain mechanism 55. However, receiver 27 may be in any shape or manner including a two-part bendable, flexible receiver operable to securely an add-on, optional control mechanism 55 of device 50 including a mouse, remote control, or the like. Receiver 27 may also be integrally formed with edge 22 or detachable therewith as needed or desired. Optionally, device 10 may include leash 26 positioned anywhere along edge 22 and preferably, in communication with corner 24. Leash 26 may further include a tension adjustment mechanism so that the end-user can, for example, adjust the corresponding tension and engagement between 50 and edge 22. Preferably, leash 26 may be in connection to corner 24 and be operable to wrap around base 53 and device 50 when assembled with portion 20.

FIGS. 7 and 8 depict related views of FIGS. 6A and 6B, wherein device 50 has again been removed so portion 20 and its features can be more easily seen. Specifically, FIG. 7 depicts a forward plan view of portion 20 so that surface 23 and edge 22 are seen with stand 40. FIG. 8 is a perspective view of FIG. 7, wherein stand 40 in FIG. 8 can more clearly be seen in a deployed state as described more particularly below. Exemplary portion 25 can also be more clearly seen in FIG. 8, portion 25 being preferably recessed so as to receive device 53. Portion 20 is not so limited, however, and portion 25 may be trimmed to fit or may be pivotable or adjustable to run continuous between corresponding corners 24 while also being capable of receiving device 53 without permanently being recessed.

Turning to FIGS. 9-16, a preferred embodiment of stand 40 is more clearly described. Specifically, FIG. 9 depicts case 10 assembled with base 53, wherein stand 40 is shown being deployed supporting base 53 and case in an elevation. FIG. 9 also depicts portion 30 coupled to portion 20. Portion 30 may be constructed from impact resistant or resilient portions such as foam, polymers or an elastomers. Portion 30 may be dimensioned to corresponding with surface 23 and partially or substantially cover the rear portion of device 50 opposite its graphical user interface or display.

It can be seen that portion 30 may include one or more raised portions 33 for additional protection to device 50 and portion 20. Moreover, portion 30 may be formed with device 20 or may be detachable via one or more fasteners 36. It is noted that each elevation associated with stand 40 can include predetermined height and/or angle of a graphical user interface of device 50 with respect to the corresponding surface on which base 53 and/or device 10 are seated. FIG. 10 simply depicts the same embodiment of FIG. 9 wherein case 10 has been rotated so that certain features of stand 40 can be more clearly seen. On the underside of stand 40, fasteners 51a and 51b can also be seen. Fasteners 51a and 51b are operable to facilitate and/or securely fasten case 10 with stand 40 in the closed state. Fasteners 51a and 51b may be magnetic fasteners recessed in respective stand 40 and case 10 so that in the closed state stand 40 and case 10 are substantially planar. The disclosed solution is not so limited, however, such that any type of fastener or fastening engagement is contemplated to be incorporated to secure stand 40 and case 10 including one or more bolts, clamps, couplings, hooks, hook and loop fasteners, pins, and/or latches.

Figure 11:
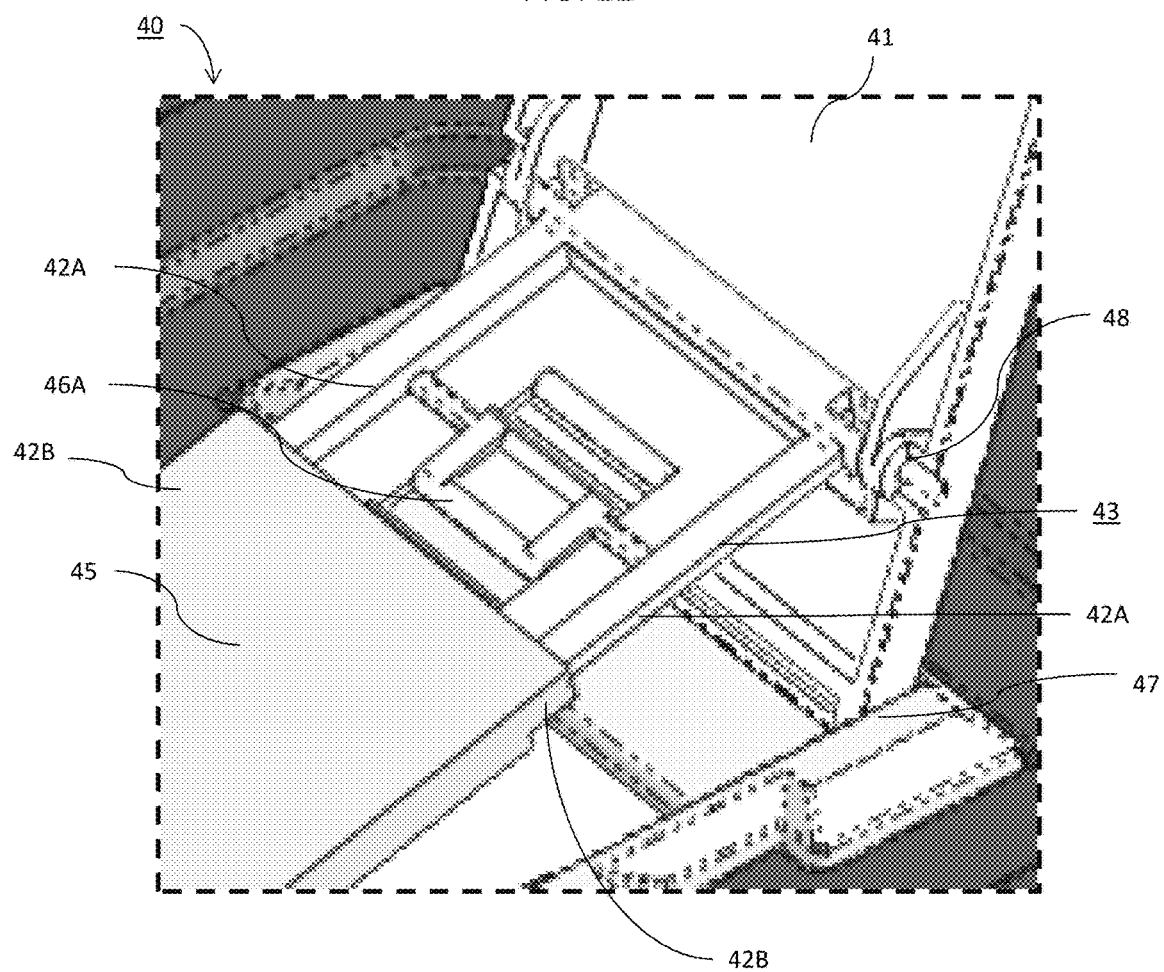
FIG. 11 is a close up view of section 11-11 of FIG. 10.

FIG. 11 in turn depicts a close up view of section 11-11 of FIG. 10. More specifically, stand 40 may comprise a stand mechanism 41 that is pivotally connected to a rotational axis 47 of portion 20. Axis 47 may be defined by a void or chamber with a fastening mechanism and/or rotational pin operable to rotably engage with mechanism 41. In turn, mechanism 41 is capable of rotating about axis 47 between a closed state in which mechanism 41 may be substantially parallel with surface 23 and/or positioned within or upon a mounting recess or cavity that is operable to correspond to mechanism 41. The herein disclosed mechanism 41 is not so limited, however, and any number of stand mechanisms can be contemplated within the disclosed solution that may adjust the position and/or elevation of corresponding case 10.

As can also be seen, positional slide 43 may be pivotally engaged with a second rotational axis 48 of stand 40. Specifically, slide 43 may include a rotational pin, rod, or axel operable to securely and pivotally engage with axis 48 which situation along lateral edges of mechanism 41 away from axis 47. As seen more particularly in FIG. 12, slide 43 may further comprise a pivot coupling 49 positioned opposite axis 48 and in communication with edge portion 22. In this respect, as mechanism 41 pivots away from case portion 20 about axis 47, slide 43 is operable to also rotate about respective axes 48 and 49 while also providing added support to stand portion 20.

Turning back to FIG. 11, it can be seen that slide 43 may include positional guides 42A to correspond with guides 42B of pivot arm 45. Arm 45 in turn may form a lower portion of slide 43 and may include coupling or axel 49. Arm 45 may also include one or more positioning mechanism 46 that operate in concert with guides 42A and B. Specifically, arm 45 may be operable to slide along guides 42A being the closed state as well as one or more elevations. To fix stand 40 in place in the one or more elevations, slide 43 may also include latch receiver 46A. Receiver 46 in turn functions as a position locking mechanism to receive a latch 46B disposed on the underside of arm 45 (opposite surface not depicted in FIG. 11). Latch 46B in turn may be designed to securely engage with receiver 46A by, for example, being extending into a void of receiver 46A until an outwardly extending portion of latch 46B fixes arm 45 in place. If it is desired that slide 43 be longer so as to affect elevation or angle imparted by stand 40 to case 10, then slide 43 may be further slid along guides 42A and 42B until the desired arrangement as defined between latch 46B and corresponding receiver 46A. At this point, latch 46B may mechanically affix to receiver 46A. Optionally, stand 40 may emit a click sound when latch 46B has been securely fastened with receiver 46A.

To release the secure engagement between latch 46B and receiver 46A, a predetermined force or movement may be applied to mechanism 41 so that stand 40 can again move between the closed state or the one or more elevations. Optionally, a release actuator may be included with stand 40 that will release a secure engagement between latch 46B and receiver 46A and/or any other features of stand 40 that may have fixed stand 40 in a particular elevated position.

Figure 12:
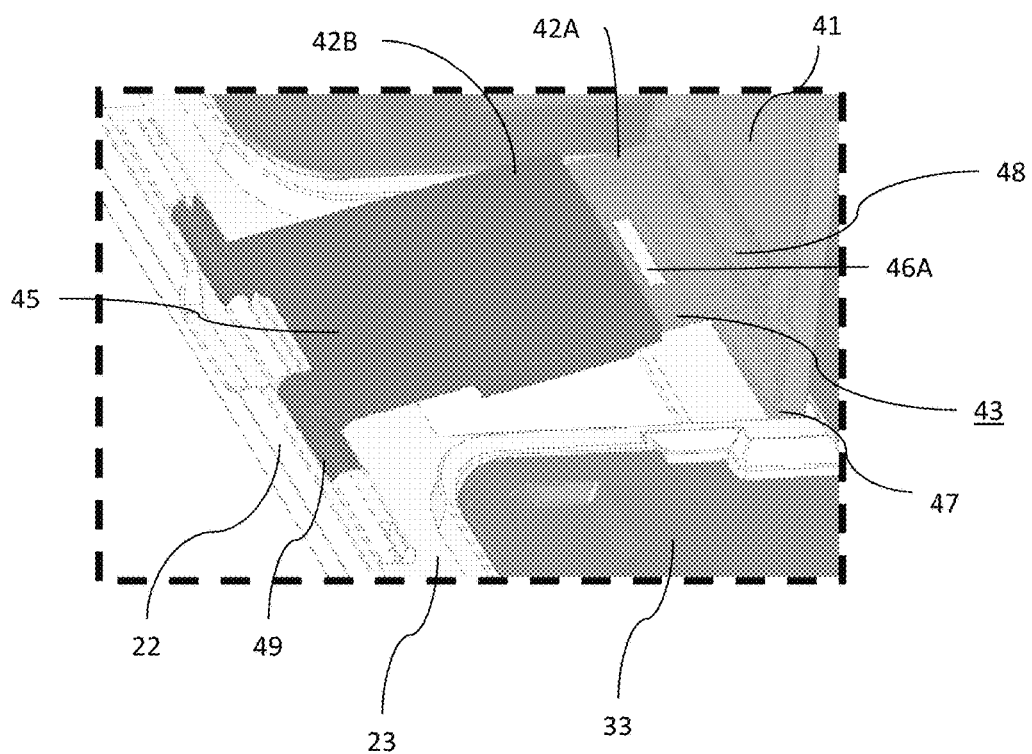
FIG. 12 is a close up view showing an exemplary adjustable support stand.
Figure 13:
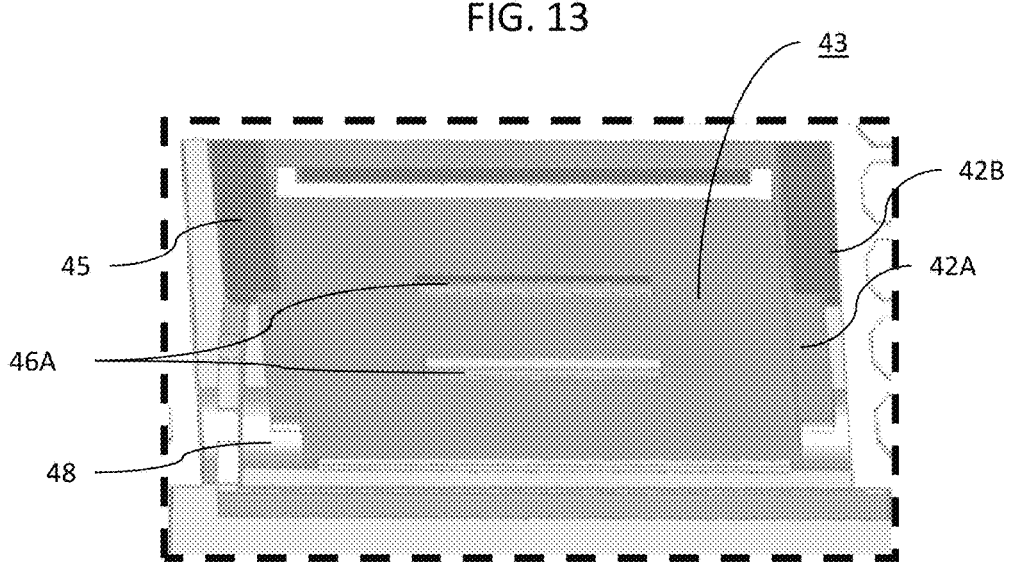
FIG. 13 is a similar view of FIG. 12 but rotated to further observe certain features of FIG. 12.
Figure 14:
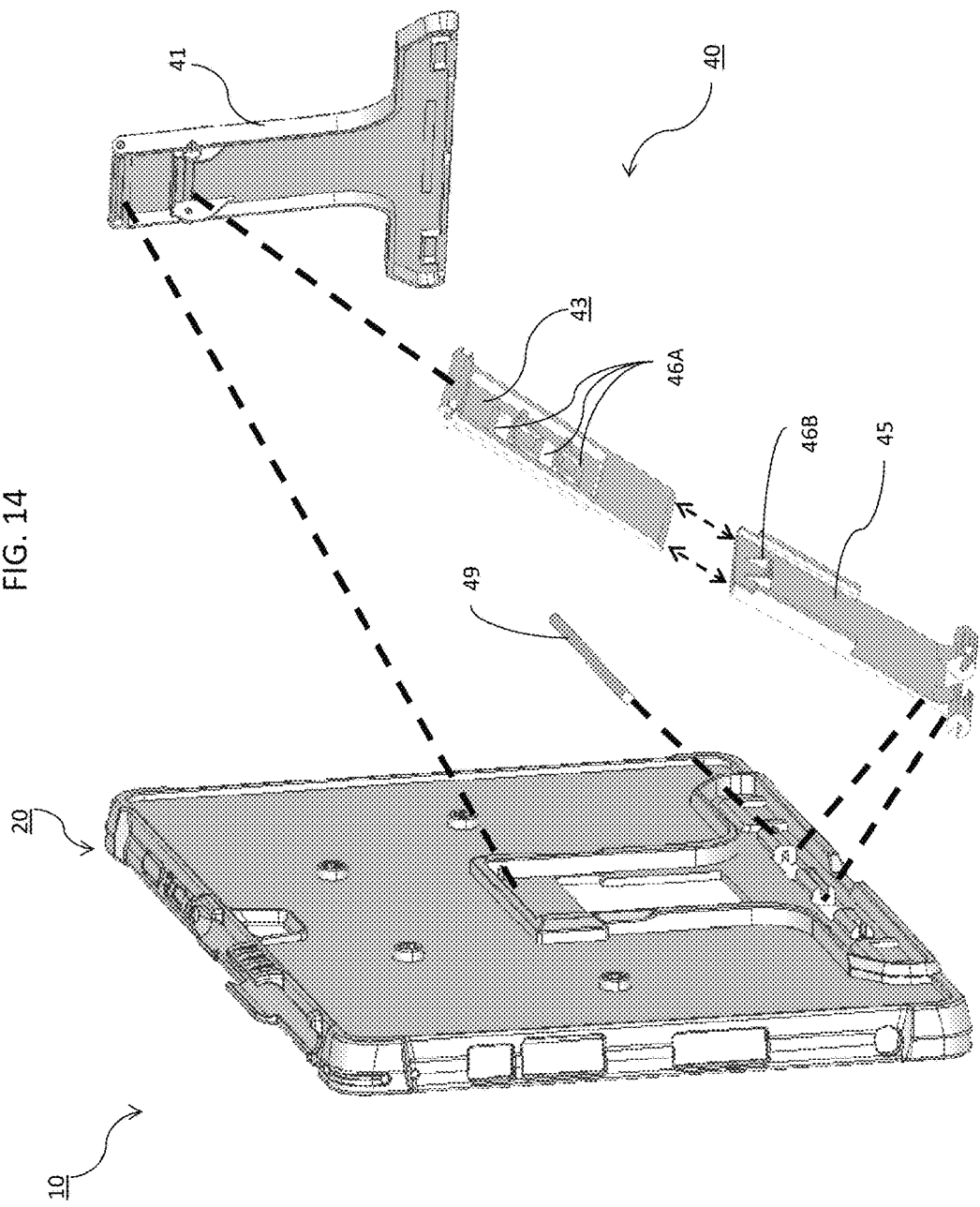
FIG. 14 is a perspective view of an exemplary case with an exemplary adjustable support stand in an exploded state.

Turning to FIGS. 12 and 13, close up views can be seen of mechanism 41, slide 43, and arm 45 when assembled with portion 20. FIG. 14 depicts case 10 with an exemplary stand 40 in an exploded state so that it can be more clearly seen how mechanism 41, slide 43, and arm 45 may assemble both with each other and with corresponding portion 20. Additionally, it can be more clearly seen how latch 46B is operable to securely engage with corresponding receiver 46A. Preferably, latch 46B may include an outwardly extending portion that can be slid into place until being affixed to receiver 46A. Latch 46B may be substantially rigid, resilient, or also constructed from elastic material operable to flex into secure engagement with corresponding receiver 46A. The coupling between receiver 46A and latch 46B is not necessarily limited to the tapered, substantially parallel edges and forward edges of FIG. 14 and any bolt, clamp, dowel, hook, joint, key or otherwise shaped latch and receiver may be included as needed or desired.

Turning to FIGS. 15A and 15B, an exemplary slide 43 is depicted. As previously described, slide 43 may comprise an upper rotational axis 48 operable to pivotally engage with mechanism 41. FIG. 15B is similar to FIG. 15A, wherein slide 43 can be seen having been rotated so that features of the opposite side are now clearly seen. Since exemplary arm 43 is in an exploded state in FIGS. 15A and 15B, guides 42A and 42B can be more clearly seen with respect to how they function together as well as latch 46B and corresponding receiver 46A. It should be noted that latch 46B, guide 42B, or axes 48 may be integrally formed or detachable as needed or desired. Latch 46B, receiver 48A, guides 41A and 42B, and/or axes 49A and 48 may be constructed from relatively resilient materials such as injection molded plastics. Alternatively, latch 46B guide 42B, or axes 48 may be formed with rubber or elastomeric material that may prevent against wear during continued use as well as mask or reduce any sounds produced when translating slide 43 between its one or more predetermined positions of the deployed state.

It is also noted that more than three or less than three receivers 46A may be included with slide 43. Optionally, receiver 46A may be positioned closer or further apart and/or more may not be completely pierced through slide 43. In other embodiments, neither latch 46B nor receivers 46A are included and instead, guides 42A and/or 42B may include fastening mechanisms operable to securely maintain slide 43 in a particular position or elevation. Optional fastening mechanism of guides 42A and/or 42B may include any clamp, bolt, coupling, dowel, latch, lock, pin, rivet, or the like formed therewith.

Figure 16A:
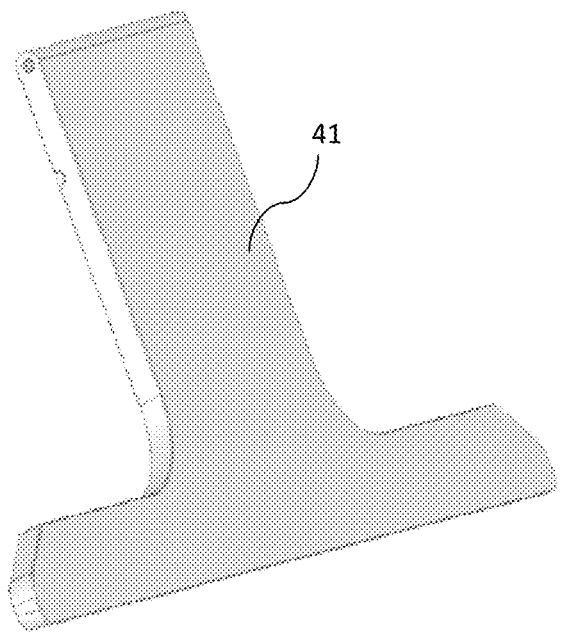
FIG. 16A is a forward perspective view of a stand mechanism of the adjustable support stand.
Figure 16B:
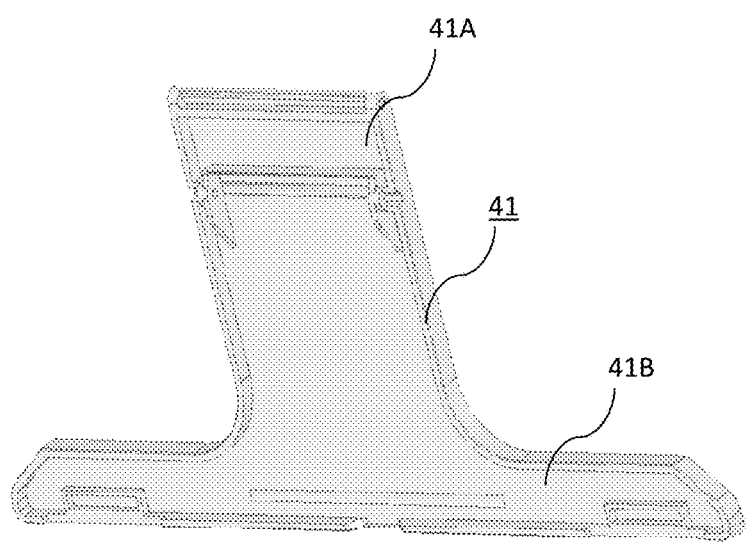
FIG. 16B is a rear perspective of the stand mechanism of FIG. 20A.

FIGS. 16A and 16B depict an exemplary stand mechanism 41, wherein FIG. 16A depicts a forward perspective view of mechanism 41 whereas FIG. 16B depicts the reverse side of mechanism 41. FIG. 16B specifically depicts the respective rotational axes of pivot portion 41A which correspond to axes 47 and 48 as previously described. Support portion 41B in turn may be the lower portion of mechanism 41 and designed to securely support case 10 when in a deployed state and situation on a mounting surface such as a table. As can be seen, portion 41B may be wider than portion 41A though mechanism 41 is not so limited. Optionally, mechanism 41 may impart structural support and stability by optional support legs (not depicted), a grip surface on the mounting lip of mechanism 41 or any other manner within the nature of the disclosed case 10.

Turning to FIG. 17, case 10 is depicted with the foregoing described stand 40 when coupled to detachable base 53 and case 50. It can be seen that stand 40 and base 53 are each in deployed state. FIGS. 18A and 18B depict similar embodiments of FIG. 17, but with the foregoing features in a closed, portable state. More specifically, FIG. 18A depicts a side plan cross section view of case 10 when assembled with device 50. It can be seen that latch 46B and receiver 46A are in a position adjacent to axis 48 and mechanism 41, slide 43, and arm 45 are substantially parallel with surface 23 of portion 20.

FIG. 18A also depicts external shield portion 30 being operatively coupled to the aft side of portion 20. In this respect, portion 30 is substantially parallel with stand 40 when in the closed, portable state and may also be substantially planar with mechanism 41. FIG. 18B is a similar embodiment to FIG. 18A but with base 53 connected thereto. It is understood that portion 20 may be include additional fastening mechanism operative to securely engage base 53 with portion 20 in addition to portion 25 and corresponding groove. For example, base 53 may be detachably hinged to portion 25 so that it in the closed, portable state of FIG. 18B, base 53 may be substantially parallel with surface 23 while also being fastened along its perimeter at one or more fastening areas or couplings. Optionally, base 53 may include impact resistant material to further protect device 50 when assembled with case and in the closed, portable state.

Figure 19A:
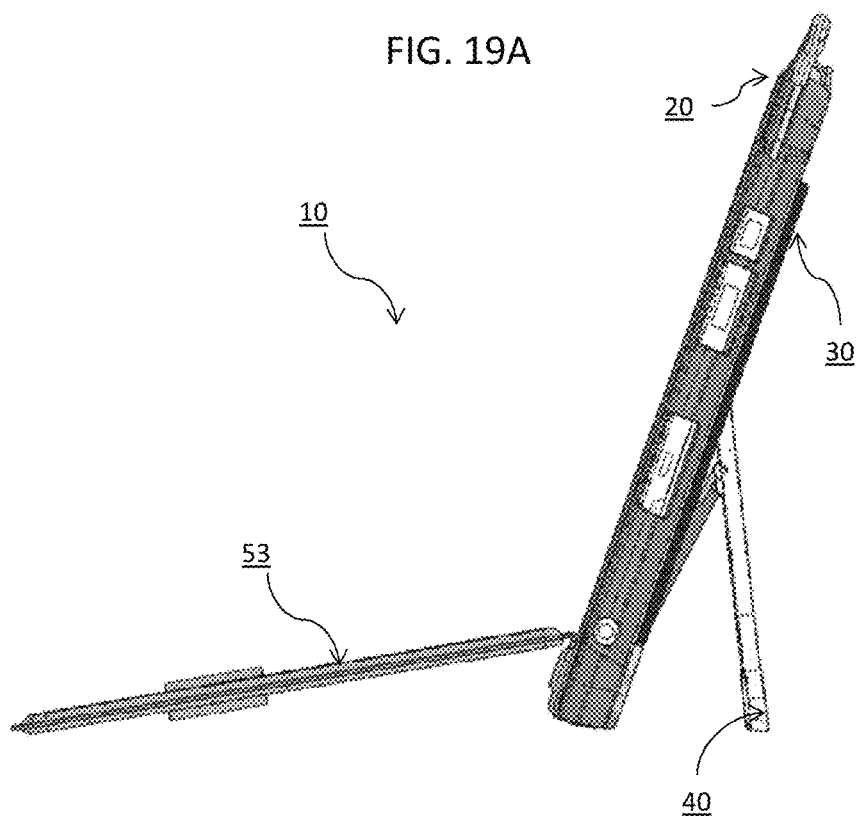
FIG. 19A is a side plan view of the embodiments described in FIG. 18B but in a deployed state
Figure 19B:
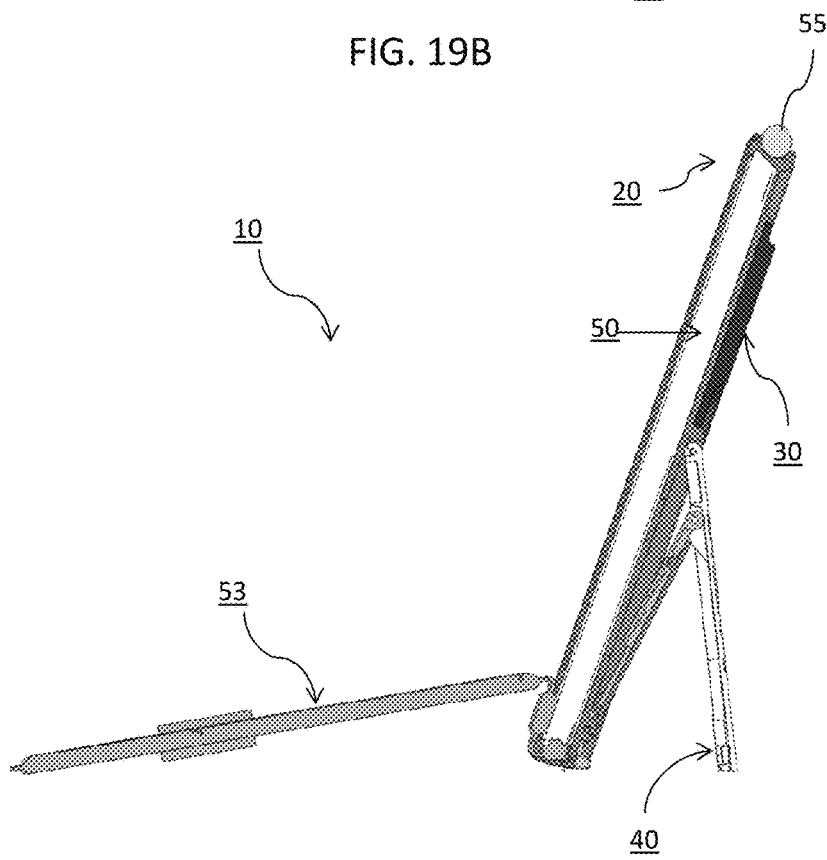
FIG. 19B is a side plan view of the embodiments of FIG. 19A taken along center cross section.

FIGS. 19A and 19B depict side plan views of the embodiments of FIGS. 18A and 18B, respectively, in a deployed state. Specifically, FIG. 19A depicts a side plan view of case 10 assembled with base 53 and device 50 in a deployed state whereas FIG. 19B depicts the same embodiment of FIG. 19A but taken along center cross section. As can be seen, stand 40 is a first elevation with mechanism 41 rotated outwardly about axis 47 and slide 43 having likewise been rotated about axis 48.

Figure 20A:
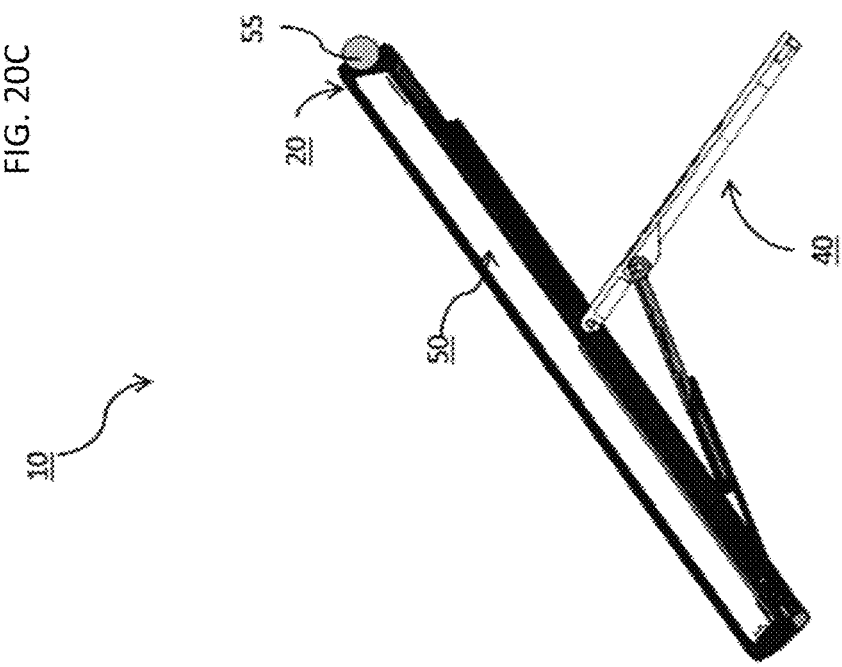
FIG. 20A is a similar view of FIG. 19A but without the base device, wherein the adjustable support stand is in a first elevation of the deployed state.
Figure 20B:
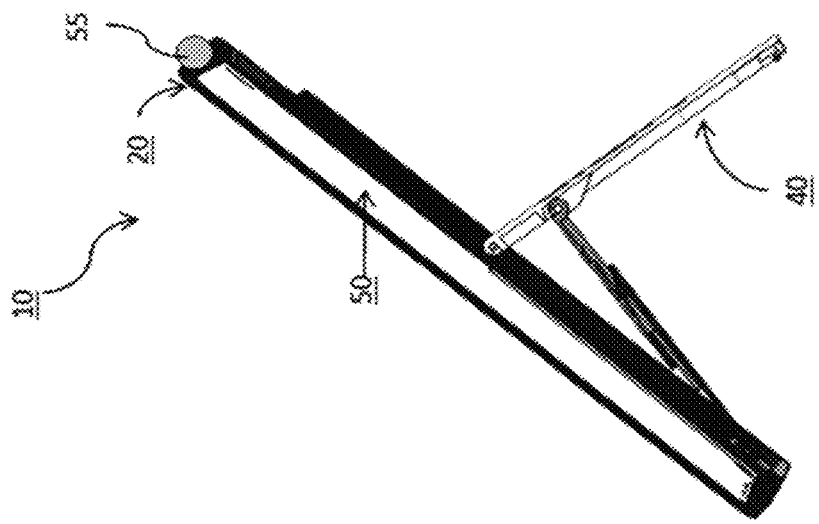
FIG. 20B is similar to FIG. 20A, wherein the adjustable support stand is in a second elevation of the deployed state.
Figure 20C:
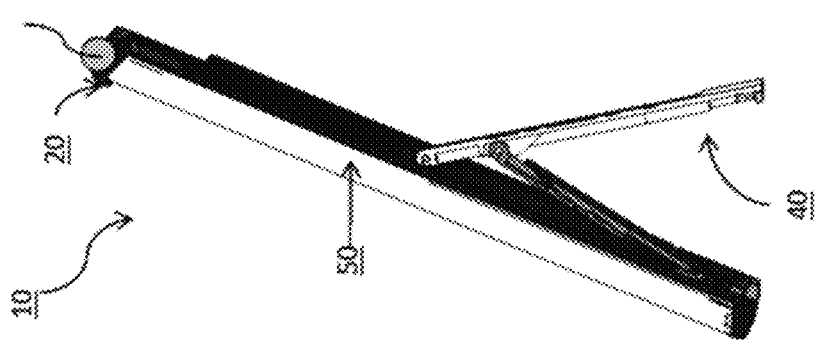
FIG. 20C is similar to FIG. 20A, wherein the adjustable support stand is in a third elevation of the deployed state.

Turning to FIGS. 20A through 20C, case 10 can be seen in a deployed state moving between three elevations. Specifically, FIG. 20 depicts stand 40 in its first, upper-most elevation with latch 46B being mechanically attached to corresponding receiver 46A. As latch 46B is positioned in its upper-most position, the elevation of case 10 is highest and the corresponding angle formed between stand 40 is most acute across FIGS. 20A through 20C. In contrast, as latch 46B moves to lower receivers 46A (see FIG. 20B and FIG. 20C) as slide translates along guides 42, it can be that the angle formed between stand 40 and case 10 becomes increasingly obtuse while the elevation imparted by stand 40 is lowered. While FIGS. 20A through 20C depict three distinct elevations and angles, it is to be understood that any number of slide positions may be defined by slide 43 and arm 45 as needed or desired.

It is to be understood the portion 20 of case 10 preferably completely or substantially envelopes case 50 when case 50 is securely engaged therewith even while adjustable stand 40 moves between closed and deployed states. This is particularly advantageous in the art as no ancillary features or stands are required to customize the computing experience with a particular device 50, safely transport said device 50 between operating environments, while ultimately protecting from the expected and unexpected accidents that tend to occur with computing devices.

Portions 20 and 30 may be integrally formed with each other or may be detachable as needed or preferred. Preferably, portion 20 and its features may be constructed from an injection molded TPU rubber but portion 20 is not so limited and it may be fabricated from a variety of materials. As can be seen throughout this disclosure, when device 50 is received and securely retained by portion 20 of case 10, case 10 and corresponding device 50 are substantially coexistive so that case 10 sufficiently protects device 50 and avoids injurious actions befalling device 50, including impacts, sharp objects, shock and scratches to the graphical user interface or display screen of device 50.

As can be seen, case 10 can easily and securely retain device 50 while also having the capability to secure device 50 in case 10 during a variety of operating environments including, but not limited to, an accidental or intentional drop. Advantageously, the described case 10 amply protects device 50 yet does not interfere with access to buttons, ports, or the device 55's graphical user interface 55. Case 10 is therefore also advantageous since if stand 40 or base 53 fails or breaks, case 10 will still protect device 50 from also incurring damage requiring repair.

As stand 40 and its components may take various forms and shapes without departing from the scope of the herein discussed solution, FIGS. 21A through 21C depict an alternative slide 143. FIG. 21A specifically depicts slide 143 in an assembled state and FIGS. 21B and 21C depicts slide 143 in an exploded state. Similar to slide 43, slide 143 may comprise an upper rotational axis 148 operable to pivotally engage with mechanism 41. FIG. 21C is similar to FIG. 21B, wherein slide 143 can be seen having been rotated so that features of the opposite side are now clearly seen. In the exploded states of FIGS. 21B and 21C, guides 142A and 142B can be more clearly seen with respect to how they function together as well as latch 146B and corresponding receiver 146A.

Similar to latch 46B, latch 146B may extend outwardly from arm 145 to communicate with and securely engage with receivers 146A. In this embodiment, receiver 146A may extend outwardly from guide 142A towards latch 146B. In this respect, receivers 146A may not include a window or cutout and instead may be recessed so as to both securely engage with latch 146B and also ensure that guides 142A and 142B remain aligned and substantially planar. Similar to the embodiments of FIG. 15, latch 146B, guide 142B, or axes 148 may be integrally formed or detachable as needed or desired. Latch 146B, receivers 148A, guides 141A and 142B, and/or axes 149A and 148 may also be constructed from relatively resilient materials such as injection molded plastics. Latch 146B, guides 142B and/or 142A, or axes 48 may also be formed with rubber or elastomeric material that may prevent against wear during continued use and/or reduce any sounds produced when translating slide 143 between its one or more predetermined deployed positions.

It is also noted that more than the depicted receivers 146A may be included with slide 143. Optionally, receivers 146A may be positioned closer or further apart and/or their respective location may be adjustable in those embodiments by, for example, being removably attached to slide 143 in the desired position through adhesives, magnets, hook and loop fasteners, sonic welding, click fit engagements, or the like.

The definitions of the words or elements of the following claims are, therefore, defined in this specification to not only include the combination of elements which are literally set forth. It is also contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination(s).

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what incorporates the essential idea of the embodiments.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A case for a computing device comprising:
   a rear support surface operatively coupled to a perimetral edge of the case that securely engages with the computing device: and
   a support stand in communication with the rear support surface, wherein the stand is operable to move between one or more elevations, wherein the support stand is pivotable about a first rotational axis of the rear support surface, the support stand comprising:
      a stand mechanism with a support portion and a pivot portion; the support portion operable to communicate with a corresponding mounting surface of the rear support surface and the pivot portion operable to pivot the support stand between a closed state and the one or more elevations;
      wherein the support portion is wider than the pivot portion, and wherein the support portion further comprises one or more fastening mechanisms operable to securely engage with the rear support surface in the closed state.

2. A case for a computing device comprising:
   a rear support surface operatively coupled to a perimetral edge of the case that securely engages with the computing device; and
   a support stand in communication with the rear support surface, wherein the stand is operable to move between one or more elevations, wherein the support stand is pivotable about a first rotational axis of the rear support surface, the support stand comprising:
      a stand mechanism with a support portion and a pivot portion, the support portion operable to communicate with a corresponding mounting surface of the rear support surface and the pivot portion operable to pivot the support stand between a closed state and one or more elevations;
      wherein the pivot portion of the support stand further comprises first and second pivot couplings, the first pivot coupling pivotally engaged with the first rotational axis of the rear support surface and the second pivot coupling pivotally engaged with a pivot arm; wherein the pivot portion operable to pivot the support stand between a closed state and the one or more elevations;
      wherein the support portion is wider than the pivot portion, and wherein the support portion further comprises one or more fastening mechanisms operable to securely engage with the rear support surface in the closed state.

3. The case of claim 2, wherein the pivot arm further comprise a guide in communication with the second pivot coupling, the guide comprising a plurality of predetermined positions.

4. The case of claim 3, wherein the pivot arm is slidable about or along the guide between the predetermined positions, wherein each predetermined position corresponds to an elevation of the case.

5. The case of claim 2, wherein the pivot arm is pivotally engaged with a second rotational axis of the rear support surface, the second rotational axis aligned with or in communication with the support portion in the closed state, and wherein the second rotational axis is adjacent to a lower part of the perimetral edge of the case.

* * * * *